(12) United States Patent
Bond

(10) Patent No.: US 6,481,782 B2
(45) Date of Patent: Nov. 19, 2002

(54) BULLET RESISTANT EXTERIOR VEHICLE BODY PROTECTOR

(76) Inventor: Greg Bond, P.O. Box 446, Woodland Hills, CA (US) 91365

(*) Notice: Subject to any disclaimer, the term of this patent is extended or adjusted under 35 U.S.C. 154(b) by 0 days.

(21) Appl. No.: 09/832,146

(22) Filed: Apr. 10, 2001

(65) Prior Publication Data

US 2002/0145305 A1 Oct. 10, 2002

(51) Int. Cl.[7] .............................. F41H 5/04; F41H 5/02; F41H 5/00; B60R 19/42
(52) U.S. Cl. ...................... 296/136; 89/36.01; 428/911; 293/128; 293/DIG. 6
(58) Field of Search ................................. 296/136, 188; 89/36.01, 36.02, 36.04; 428/911; 293/128, DIG. 6

(56) References Cited

U.S. PATENT DOCUMENTS

| | | | | |
|---|---|---|---|---|
| 3,147,176 A | * | 9/1964 | Haslam ................. | 293/DIG. 6 |
| 4,014,583 A | * | 3/1977 | Forbes .................. | 293/62 |
| 4,810,015 A | * | 3/1989 | McNeil .................. | 293/128 |
| 4,953,442 A | * | 9/1990 | Bartuski ................ | 89/36.02 |
| 4,979,426 A | * | 12/1990 | Sprague ................ | 89/36.02 |
| 5,312,145 A | * | 5/1994 | McNeil .................. | 293/128 |
| 5,333,532 A | * | 8/1994 | Smirlock et al. ........ | 89/36.02 |
| 5,804,757 A | * | 9/1998 | Wynne .................. | 89/36.05 |
| 5,811,719 A | * | 9/1998 | Madden, Jr. ........... | 89/36.08 |
| 6,027,158 A | * | 2/2000 | Yang .................... | 296/146.6 |

* cited by examiner

Primary Examiner—D. Glenn Dayoan
Assistant Examiner—H. Gutman

(57) ABSTRACT

A lightweight, flexible, removable, bullet-resistant protective shield placed easily on the lateral side of a vehicle door which includes a magnetic backing covered by a bullet-resistant mesh material. It lacks any further mounting apparatus and can be manually placed on either lateral, exterior sides of that portion of a vehicle that encloses the front or rear seat compartments. The two-layer, protective shield can be easily installed, removed and transferred from one vehicle door to another. The bullet-resistant exterior vehicle body protector is of such a dimension as to cover the portion of the vehicle below the side windows and between the front and rear quarter panels longitudinally.

1 Claim, 1 Drawing Sheet

BULLET RESISTANT EXTERIOR VEHICLE BODY PROTECTOR

CROSS REFERENCE TO RELATED APPLICATION

This application is derived from an initial Utility Patent Application for a similar, though not bullet-resistant, invention titled "EXTERIOR VEHICLE BODY PROTECTOR", Filing #: Ser. No. 09/832,145, filed concurrently with this application on Apr. 10, 2001.

STATEMENT REGARDING FEDERALLY SPONSORED RESEARCH OR DEVELOPMENT

Not Applicable.

REFERENCE TO MICROFICHE APPENDIX

Not Applicable.

BACKGROUND OF THE INVENTION

1. Field of the Invention

The invention relates to a two-layer, bullet-resistant protective shield that is placed on the exterior of a vehicle body to protect occupants inside the vehicle. This shield can be easily installed, removed, and transferred from one vehicle to another.

2. Description of the Related Art

U.S. Pat. No. 3,147,176 (Haslam) discloses an exterior protector strip that is attached by a series of small magnets onto the moldings of the vehicle. These thin, protective strips attached by small magnets are placed on various contours along the entire vehicle body.

U.S. Pat. No. 4,014,583 (Forbes) discloses a bump protector composed of an indescript interior filling material with magnetic members to adhere it to the automobile side panel. Utilizes hanger straps and cable to suspend the bump protector to the automobile side panel where it is affixed.

U.S. Pat. No. 4,810,015 (McNeil) discloses use of a foam pad affixed to top and bottom of vehicle by two magnets and further stabilized by straps attached to wheel wells.

U.S. Pat. No. 5,312,145 (McNeil) discloses a foam material bonded to a magnetic material that is formed into a series of panels. These panels are stitched together forming hinges and surrounded by nylon or other material.

U.S. Pat. No. 5,811,719 (Madden, Jr.) discloses a bullet-resistant curtain containing fibrous material that has to be attached and secured to the frame below the window in the vehicle door.

U.S. Pat. No. 6,027,158 (Yang) discloses a bulletproof door assembly attached to the vehicle body by a mounting rack, onto which stiff rods attached to the protective sheet are affixed into the mounting holes set into the vehicle door assembly.

The patents discussed in the preceding paragraphs utilize various materials that are complicated in form and are affixed to the vehicle exterior by attachment straps or a mounting apparatus and reinforced. The apparatus of the present invention incorporates an inexpensive, yet effective means of protection for law enforcement vehicles or other vehicles whose occupants might attract or anticipate gunfire by using a bullet-resistant material affixed to a magnetic backing so it can be easily installed, removed and transferred to various vehicles. It is used as a shield to prevent penetration of bullets of other propelled objects/projectiles into the interior of a vehicle from the outside.

SUMMARY OF THE INVENTION

The object of the invention is to provide the user with an exterior vehicle body protector which is resistant to bullets or other propelled objects/projectiles, and is lightweight, flexible, easily attached, removed and transferred from a vehicle as well as inexpensive to manufacture.

Accordingly, this two-layer protective shield consists of a magnetic backing coated with a bullet-resistant material which results in a flexible, lightweight panel that can be placed longitudinally along the lateral, exterior door of a vehicle, below the window, in position with the occupants inside. The bullet-resistant shield will be firmly secured against the metal exterior of the vehicle by virtue of the completely magnetic backing.

This invention is based upon the idea behind another application for invention titled "EXTERIOR VEHICLE BODY PROTECTOR", filing #: Ser. No. 09/832,145, which was filed concurrently with this application on Apr. 10, 2001.

DESCRIPTION OF THE PREFERRED EMBODIMENT

Figure 1:
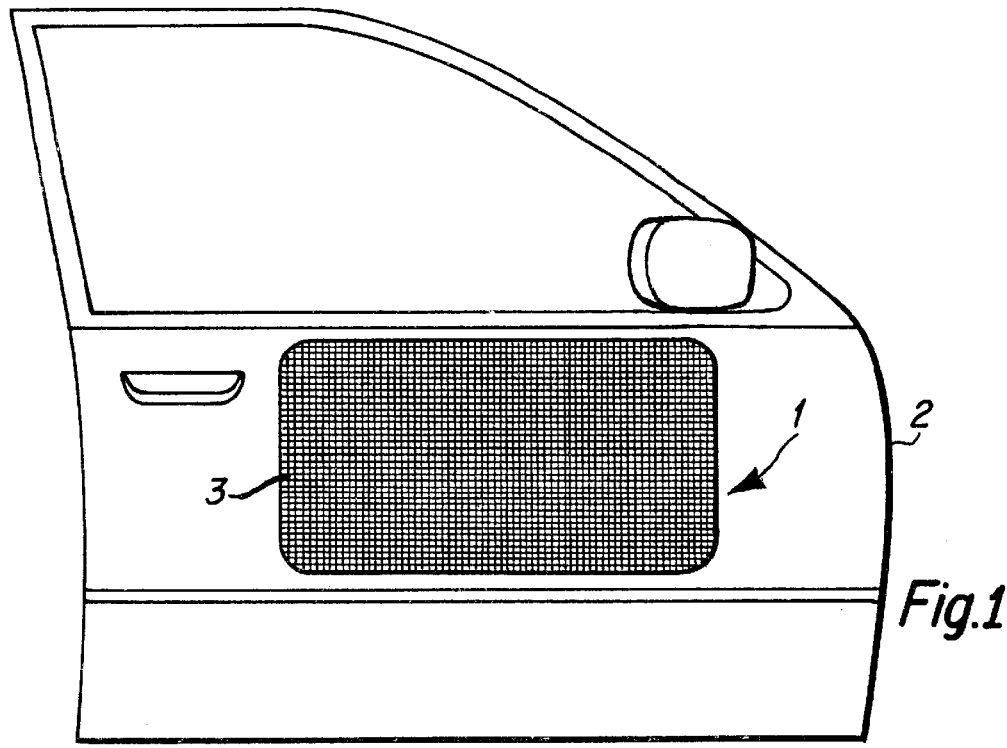
FIG. 1 is a perspective view of a vehicle door with the present invention secured to the lateral exterior thereof.

In FIG. 1, a right front door of a vehicle is shown. FIG. 1 illustrates a perspective view of said right front door 2 with the present invention 1 correctly secured thereof. This invention is to be attached to the lateral exterior of the vehicle body as shown. The protective shield consists of the magnetic backing which is attached to the metal exterior of the vehicle, and a bullet-resistant mesh coating 3 which faces the outside when placed in correct functional position on the door of the vehicle.

As shown, the bullet-resistant protective shield 1 is placed longitudinally on the lateral exterior of the vehicle door 2, placed in the proximal and distal planes in line with the occupants inside said vehicle.

Figure 2:
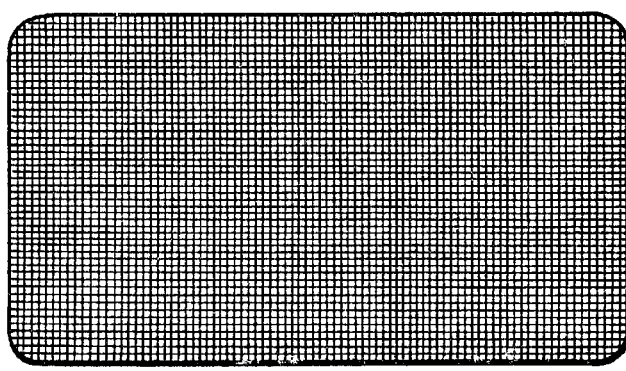
FIG. 2 is a front elevational view of the bullet-resistant car exterior protector showing new design.

FIG. 2 shows a frontal elevational view of the bullet-resistant mesh coating 3 that will not only protect the vehicle occupants from propelled objects/projectiles, but also protect the metal exterior of the vehicle from damage upon impact with most objects.

Figure 3:
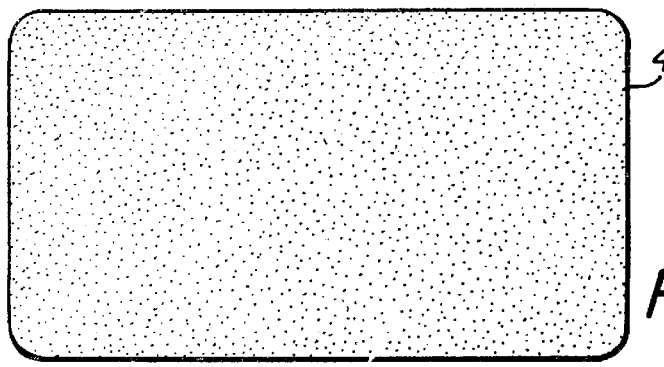
FIG. 3 is a rear elevational view thereof.

FIG. 3 shows a rear elevational view of the securing component of the present invention. This completely magnetic backing 4 insures a firm contact with the metal exterior of the vehicle, as well as easy removal and placement on the exterior of another vehicle.

Figure 4:
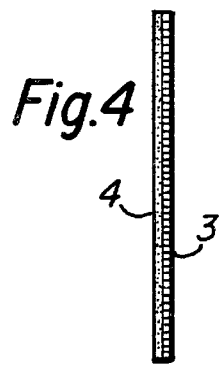
FIG. 4 is a left side elevational view in partial section.

FIG. 4 is a left side elevational view in partial section illustrating the two layers of the protective shield. The completely magnetic backing 4 adheres to the metal exterior of the vehicle door, while the bullet-resistant mesh material 3 faces the outside and repels bullets and other propelled objects/projectiles from the occupants of the vehicle.

Figure 5:
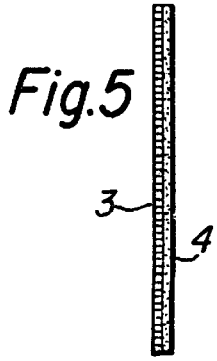
FIG. 5 is a right side elevational view in partial section.

FIG. 5 is a right side elevational view in partial section illustrating the two layers of the protective shield. The completely magnetic backing 4 adheres to the metal exterior of the vehicle door, while the bullet-resistant mesh material 3 faces the outside and repels bullets and other propelled objects/projectiles from the occupants of the vehicle.

Figure 6:
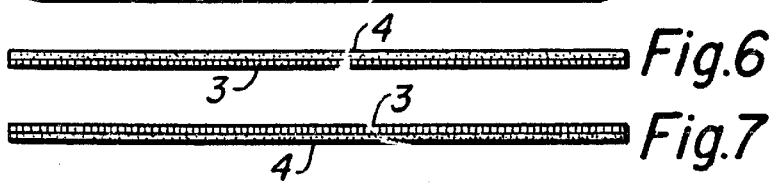
FIG. 6 is a top plan view in partial section.

FIG. 6 is a top plan elevational view in partial section illustrating the two layers of the protective shield. The completely magnetic backing 4 adheres to the metal exterior of the vehicle door, while the bullet-resistant mesh material 3 faces the outside and repels bullets and other propelled objects/projectiles from the occupants of the vehicle.

Figure 7:
FIG. 7 is a bottom plan view in partial section.

FIG. 7 is a bottom plan elevational view in partial section illustrating the two layers of the protective shield. The completely magnetic backing 4 adheres to the metal exterior of the vehicle door, while the bullet-resistant mesh material 3 faces the outside and repels bullets and other propelled objects/projectiles from the occupants of the vehicle.

As illustrated above, the lightweight, flexible, easily removable bullet-resistant protective shield of the present invention can be secured longitudinally on the lateral exterior of a vehicle door with minimal difficulty, as well as removed and transferred for use with another vehicle. This makes it a very convenient and effective means of protection for the occupants inside the vehicle. Thus, the objective of the present invention is achieved.

It is apparent that many modifications and variations of the present invention can be made with respect to proportions, materials, structure and components that can be adapted to specific operations and differing environments. The claims below are to encompass and include any and all such adaptations within the boundaries of the scope and spirit of the present invention.

I claim:

1. A bullet-resistant exterior vehicle body protector to be secured to the lateral exterior portion of a vehicle body, wherein the apparatus consists of:
   a flexible, lightweight, removable completely magnetic backing that adheres to the metal exterior of the vehicle door, below the window, and positioned longitudinally with respect to the occupants inside the vehicle;
   a lightweight, bullet-resistant mesh material, layered in the same area on top of the completely magnetic backing, that faces the outside when the protective shield adheres to the vehicle door.

* * * * *